(12) United States Patent
Ventelon et al.

(10) Patent No.: US 8,545,031 B2
(45) Date of Patent: Oct. 1, 2013

(54) MIRROR

(75) Inventors: Lionel Ventelon, Jumet (BE); Olivier Bouesnard, Jumet (BE); Bruno Cosijns, Jumet (BE)

(73) Assignee: AGC Glass Europe, Bruxelles (BE)

( * ) Notice: Subject to any disclaimer, the term of this patent is extended or adjusted under 35 U.S.C. 154(b) by 0 days.

(21) Appl. No.: 13/058,116

(22) PCT Filed: Aug. 10, 2009

(86) PCT No.: PCT/EP2009/060344
§ 371 (c)(1),
(2), (4) Date: May 6, 2011

(87) PCT Pub. No.: WO2010/018152
PCT Pub. Date: Feb. 18, 2010

(65) Prior Publication Data
US 2011/0267713 A1     Nov. 3, 2011

(30) Foreign Application Priority Data
Aug. 11, 2008 (EP) .................................. 08162132

(51) Int. Cl.
*G02B 5/08* (2006.01)
*G02B 7/182* (2006.01)
(52) U.S. Cl.
USPC .......................................... 359/883; 359/900
(58) Field of Classification Search
USPC .................... 359/838, 883, 884, 900
See application file for complete search history.

(56) References Cited

U.S. PATENT DOCUMENTS

| 621,360 | A | | 3/1899 | Miller | |
|---|---|---|---|---|---|
| 1,724,204 | A | * | 8/1929 | Kelly | 451/44 |
| 2,041,667 | A | | 5/1936 | Thomas | |
| 2,123,049 | A | * | 7/1938 | Irby | 428/622 |
| 4,436,373 | A | | 3/1984 | Kirsch | |
| 4,547,432 | A | | 10/1985 | Pitts et al. | |
| 4,780,372 | A | * | 10/1988 | Tracy et al. | 428/428 |
| 4,963,012 | A | | 10/1990 | Tracy et al. | |
| 5,096,785 | A | * | 3/1992 | Somerhausen et al. | 428/626 |
| 5,535,056 | A | * | 7/1996 | Caskey et al. | 359/603 |

(Continued)

FOREIGN PATENT DOCUMENTS

| AU | 5764573 | | 1/1975 |
|---|---|---|---|
| EP | 1 577 277 | | 9/2005 |
| EP | 1860076 | * | 11/2007 |

(Continued)

OTHER PUBLICATIONS

International Search Report Issued Sep. 21, 2009 in PCT/EP09/060344 filed Aug. 10, 2009.

(Continued)

*Primary Examiner* — Ricky D Shafer
(74) *Attorney, Agent, or Firm* — Oblon, Spivak, McClelland, Maier & Neustadt, L.L.P.

(57) ABSTRACT

Mirror consisting of a glass substrate having a front surface and a rear surface, the rear surface carrying, in order, a silver coating layer and at least one base paint layer. The glass substrate, the silver coating layer, and the at least one base paint layer each have an edge portion having a rear facing surface arranged at an acute angle to the front surface of the mirror. An additional paint layer covers the entire surface of the base paint layer and the rear facing surfaces of the glass substrate and the silver coating layer.

13 Claims, 1 Drawing Sheet

(56) References Cited

U.S. PATENT DOCUMENTS

Figure 1A:
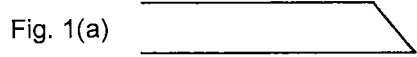
Figure 1C:
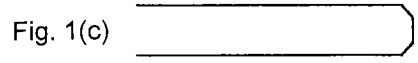
Figure 1B:
Figure 1D:
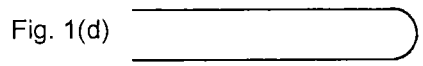

| | | | |
|---|---|---|---|
| 5,757,564 A * | 5/1998 | Cross et al. | 359/870 |
| 5,793,530 A * | 8/1998 | Lang | 359/514 |
| 5,912,777 A | 6/1999 | Jaworske | |
| 6,565,217 B2 * | 5/2003 | Laroche et al. | 359/838 |
| 2001/0033935 A1 | 10/2001 | Laroche et al. | |
| 2002/0057494 A1 * | 5/2002 | Lang | 359/507 |
| 2005/0018330 A1 * | 1/2005 | Sakoo et al. | 359/884 |
| 2007/0177284 A1 * | 8/2007 | Tournay et al. | 359/838 |
| 2007/0281169 A1 * | 12/2007 | Pilloy | 428/429 |
| 2009/0153988 A1 | 6/2009 | Ventelon et al. | |
| 2010/0271694 A1 * | 10/2010 | Bamber | 359/360 |

FOREIGN PATENT DOCUMENTS

| | | | |
|---|---|---|---|
| JP | 11 128041 | | 5/1999 |
| JP | 2006-219607 | * | 8/2008 |
| KR | 2004-019745 | * | 3/2004 |

OTHER PUBLICATIONS

U.S. Appl. No. 13/121,869, filed Mar. 30, 2011, Ventelon, et al.

* cited by examiner

MIRROR

This invention relates to mirrors and to a process of manufacturing mirrors.

The mirrors of this invention may have various applications, for example: domestic mirrors used for example in furniture, wardrobes or bathrooms; mirrors in make-up boxes or kits; mirrors used in the automotive industry, as rear-view mirrors for cars, for example. This invention may be particularly advantageous in relation to mirrors for use as solar energy reflectors.

The mirrors of this invention may be used as reflectors in solar energy or heating installations, for example concentrating solar power plants. Such installations use the solar energy to first generate heat, which later can be converted into electricity or used for steam production. Concentrating solar power plants wherein mirrors according to the present invention may be used comprise, for example, parabolic trough power plants, central tower power plants (also called heliostat power plants), dish collectors and Fresnel reflector power plants. Mirrors according to the present invention may be used as flat or curved solar energy reflectors. They may be laminated to a supporting sheet or be self-supporting.

Domestic mirrors and mirrors for solar applications have generally been produced as follows: a sheet of flat glass (float, soda-lime glass) was first of all polished and then sensitised, typically using an aqueous solution of $SnCl_2$; after rinsing, the surface of the glass was usually activated by means of an ammoniacal silver nitrate treatment, and a silvering solution was then applied in order to form an opaque coating of silver; this silver coating was then covered with a protective layer of copper and then with one or more coats of leaded paint in order to produce the finished mirror. The combination of the protective copper layer and the leaded paint was deemed necessary to provide acceptable ageing characteristics and sufficient corrosion resistance.

More recently, mirrors were developed which dispensed with the need for the conventional copper layer, which could use substantially lead-free paints and yet which still had acceptable or even improved ageing characteristics and corrosion resistance. For example, U.S. Pat. No. 6,565,217 describes embodiments of a mirror with no copper layer which comprises in the order recited: a vitreous substrate; both tin and palladium provided at a surface of the vitreous substrate; a silver coating layer on said surface of the substrate; tin present at the surface of the silver coating layer which is adjacent to an at least one paint layer; and at least one paint layer covering the silver coating layer. Such mirrors provided a significant advance with respect to conventional coppered mirrors.

Ageing characteristics and corrosion resistance are important properties for a mirror. Domestic mirrors, for example, should withstand a bathroom's humid atmosphere. For mirrors used as solar energy reflectors, corrosion, in particular edge corrosion, may be responsible for a loss in the total reflective surface of a concentrating solar power plant with time, giving rise to a loss in the yield of the plant. Therefore, it may be necessary to replace from time to time the mirrors of the plant with new ones, which is time-consuming and expensive. There is thus a need for mirrors with increased lifetime, in particular with better corrosion resistance, especially edge corrosion resistance.

New generation mirrors with no copper layer may provide good corrosion resistance, often better than conventional coppered mirrors. However we have found that it may still be possible to improve their corrosion resistance, in particular their edge corrosion resistance, thereby improving their resistance to ageing.

According to one of its aspects, the present invention provides a mirror. Dependent claims define preferred and/or alternative aspects of the invention.

Mirrors with no copper layer according to the invention comprise a glass substrate having a front surface and a rear surface, said rear surface carrying, in order, a silver coating layer and at least one base paint layer. The glass substrate, the silver coating layer and the at least one base paint layer have each an edge portion having a rear facing surface arranged at an acute angle to the front surface of the mirror and an additional paint layer covers substantially the whole surface of the at least one base paint layer and the rear facing surfaces of the glass substrate, silver coating layer and at least one base paint layer.

This may be advantageous in that the silver coating layer, the interface between the silver layer and the base paint layer and the interface between the silver layer and the glass substrate may not be exposed and may be protected by the additional paint layer.

Advantageously, one or more material may be deposited during an activating step on a surface of the glass substrate on which the silver layer is to be deposited; this may contribute to the corrosion resistance of the mirror. Such material may be selected from the group consisting of bismuth, chromium, gold, indium, nickel, palladium, platinum, rhodium, ruthenium, titanium, vanadium and zinc. Palladium is preferred. Tin may be provided at or on a surface of the glass substrate on which the silver layer is to be deposited; this may sensitise the glass substrate and may facilitate adhesion of the silver layer thereto. Preferably, one or more material(s) may be deposited during a passivating step on the surface of the silver coating layer on which the paint layer is to be deposited; this may contribute to the corrosion resistance of the mirror. Such material may be selected from the group consisting of tin, palladium, vanadium, titanium, iron, indium, copper, aluminium chromium, lanthanum, nickel, europium, zinc, platinum, ruthenium, rhodium, sodium, zirconium, yttrium and cerium. Tin and palladium are preferred.

Materials provided at the surface of the glass substrate during an activating and/or sensitising step and/or at the surface of the silver layer during a passivating step are preferably provided as islets, that is to say that preferably they do not produce a distinct continuous layer of, for example, palladium, but that the material is in the form of islets on the surface of the glass.

Preferably, the silver coating layer of the mirror has a thickness of at least 80 nm, at least 100 nm, more preferably at least 120 nm, or at least 140 nm; its thickness may be less than 200 nm, preferably less than 180 nm. These values offer a good compromise between a good light or energetic reflectance value and an acceptable cost of production. Preferably, for solar applications, the glass substrate of the mirror is made of extra-clear glass, i.e. a glass with a total iron content expressed as $Fe_2O_3$ of less than 0.02% by weight. This also may favour a good energetic reflectance value.

In one preferred embodiment of mirrors according to the invention, at least one of the paint layers applied over the silver layer is lead-free or substantially lead-free. This is advantageous in that lead is toxic and its avoidance has environmental benefits. Substantially lead-free means herein that the proportion of lead in the paint is significantly less than the proportion of lead in leaded paints conventionally used for mirrors. The proportion of lead in a substantially lead-free paint layer as herein defined is less than 500 mg/m², preferably less than 400 mg/m$^2$, more preferably less than 300 mg/m$^2$. The proportion of lead in a lead-free paint layer as herein defined is less than 100 mg/m$^2$, preferably less than 80 mg/m$^2$, more preferably less than 60 mg/m$^2$. Paints used herein may be, for example, acrylic, epoxy, or alkyd-based.

Traces of silane may be present at the surface of the silver coating layer which is provided adjacent to the at least one paint layer covering the silver coating layer. The treatment of the silver coating layer with a silane before painting may enhance and/or contribute towards the resistance of the mirror to abrasion and/or corrosion.

Advantageously, the thickness of the mirror may be greater than 0.9 mm or 1.1 mm; it may be less than 2 mm or 1.5 mm; it may preferably be around 0.95 or 1.25 mm. Such thin and flexible mirrors may be used in applications were curved reflectors are needed. When flat reflectors are used, or for domestic use, the thickness of the mirror may be greater than 2 mm or 2.5 mm; it may be less than 8, 6 or 5 mm.

Resistance to ageing and/or corrosion of mirrors may be defined with reference to the CASS test, i.e. copper-accelerated acetic acid salt spray test. In that test the mirror is placed in a testing chamber at 50° C. and is subjected to the action of a fog formed by spraying an aqueous solution containing 50 g/l sodium chloride, 0.26 g/l anhydrous cuprous chloride with sufficient glacial acetic acid to bring the pH of the sprayed solution to between 3.1 and 3.3. Full details of this test are set out in International Standard ISO 9227-1990. Mirrors may be subjected to the action of the saline fog for different lengths of time, whereafter the reflective properties of the artificially aged mirror may be compared with the reflective properties of the freshly formed mirror. An exposure time of 5 days may give a useful indication of the resistance of a mirror to ageing. The CASS test is performed on 10 cm square reflector tiles, and after exposure to the copper-accelerated acetic acid salt spray for 5, 10, 15, 20 days or more, each tile is subjected to microscopic examination. The principal visible evidence of corrosion is a darkening of the silver layer of the mirror around its margins. The extent of corrosion is noted at five regularly spaced sites on each of two opposed edges of the tile and the mean average of these ten measurements is calculated. Preferably, the average corrosion after 5 days is less than 100 µm or less than 90 µm, more preferably less than 80 µm or still more preferably less than 70 µm. Preferably, the average corrosion after 25 days is less than 220 µm, more preferably less than 200 µm or still more preferably less than 190 µm. Preferably, the average corrosion after 45 days is less than 320 µm, more preferably less than 300 µm or still more preferably less than 280 µm. For a more representative evaluation, the CASS test may be performed on ten samples of a mirror and the mean average of the ten samples calculated from the mean average of each sample.

According to other aspects, the present invention provides a solar energy reflector and a method for manufacturing a mirror.

In methods of manufacturing mirrors according to certain aspects of the invention, sensitising, activating and passivating steps may contribute to the ageing and/or corrosion resistance of the mirrors and/or to their durability. Preferably, the solutions brought into contact with the glass substrate during the successive manufacturing steps are sprayed onto the glass substrate with optional intervening rinsing and/or washing steps. For example, during the industrial manufacture of flat mirrors, sheets of glass may pass through successive stations where sensitisation, activation, silvering and passivating reagents are sprayed. In practice, on a mirror production line, the sheets of glass are generally conveyed along a path by a roller conveyor. They are first of all polished and rinsed prior to being sensitised by means for example of a tin chloride solution sprayed on the glass; they are then rinsed again. An activating solution is then sprayed onto the sheets of glass; this activating solution may be for example, an acidic aqueous solution of PdCl$_2$. The sheets of glass then pass to a rinsing station where demineralised water is sprayed, and then to the silvering station where a traditional silvering solution is sprayed, the silvering solution being combined upon application to the glass from two separately sprayed solutions, one solution comprising a silver salt and either a reducing agent or a base and the other solution comprising whichever component (a reducing agent or a base) which is absent from the solution containing the silver salt. The flow rate and concentration of the silvering solution sprayed onto the glass are controlled so as to form a layer of silver of a desired thickness, for example containing between 800 and 2000 mg/m$^2$ of silver, preferably in the range 1400-1800 mg/m$^2$ of silver. The glass is then rinsed and directly after the rinsing of the silver coating, an aqueous solution of for example SnCl$_2$ is sprayed onto the silvered glass sheets as they move forward along the conveyor. After a further rinsing, the mirrors may then be treated by spraying with a solution containing a silane. After rinsing and drying, the mirrors are covered with one or two base paint layers, which may be of a same or different composition. The base paint is then cured or dried, for example in a tunnel oven. Preferably, the base paint layer is applied onto the silvered substrates in the form of a continuous curtain of liquid paint falling onto the glass sheets in a curtain coating process. The thickness of the base paint layer is preferably at least 10 µm, preferably at least 15 µm, more preferably at least 20 µm; it is preferably not more than 50 µm, not more than 40 µm, more preferably not more than 30 µm. When two base paint layers are used, the thickness of the first base paint layer is preferably at least 10 µm, at least 15 µm, or at least 20 µm and not more than 50 µm, not more than 40 µm, or not more than 30 µm; the thickness of the second base paint layer is preferably at least 20 µm, at least 25 µm, or at least 30 µm and preferably not more than 60 µm, not more than 50 µm, or not more than 40 µm.

According to the present invention, the mirrors are preferably cut to size, then edge-worked, preferably along substantially at least three sides thereof, more preferably along substantially their entire periphery, by grinding, bevelling, chamfering or any other known method. Various types of profiles may be obtained: for example, bevelled profile, chamfered (1 side), chamfered (2 sides) or rounded (circular). An additional paint layer is then applied over the edge-worked mirror, covering substantially the whole surface of the at least one base paint layer and at least a portion of the glass substrate which has been edge-worked.

Preferably, the additional paint layer is applied by curtain coating. This may be advantageous in that the edge-worked surface of the mirror (i.e. the rear facing surface arranged at an acute angle to the front surface of the mirror) may be well exposed to the additional paint falling vertically on the edge-worked mirror. When curtain coating non edge-worked mirrors, we have noted that the edge of the mirror arriving first under the curtain is generally covered by the paint because it first breaks the curtain, the two lateral edges and the last edge are generally not covered by the paint. This may lead to edge corrosion resistance values which are different for the four edges of the mirror and a general corrosion resistance for the mirror which is not very high. We have found that by edge-working the mirror prior to the application of the additional paint layer (which is generally the outermost paint layer), the edges of the mirror, which, due to the edge working, are not simply flat edges perpendicular to the surface of the mirror, may be more exposed to the paint falling from the curtain; this may more effectively or more consistently protect the silver coating layer and/or the interface between the silver layer and the base paint layer and/or the interface between the silver layer and the glass substrate at the periphery of the mirror. Therefore, preferably, the corrosion resistance of the finished mirror is similar at each of its sides. Furthermore, it may be advantageous to edge-work the silvered substrate once a layer of paint is already protecting the silver coating layer from the attacks of the edge-working process. After application of the additional paint layer, preferably no further cutting step should be carried out.

The finished mirror may have a luminous reflectance of at least 85%, preferably at least 90% measured through the glass substrate; the luminous reflection may be less than 98% or less than 96%. The finished mirror may have an energetic reflectance according to standard ISO 9050:2003 of greater than 90%, preferably greater than 92%. The energetic reflectance may be less than 96% or less than 95%.

Figure 2:
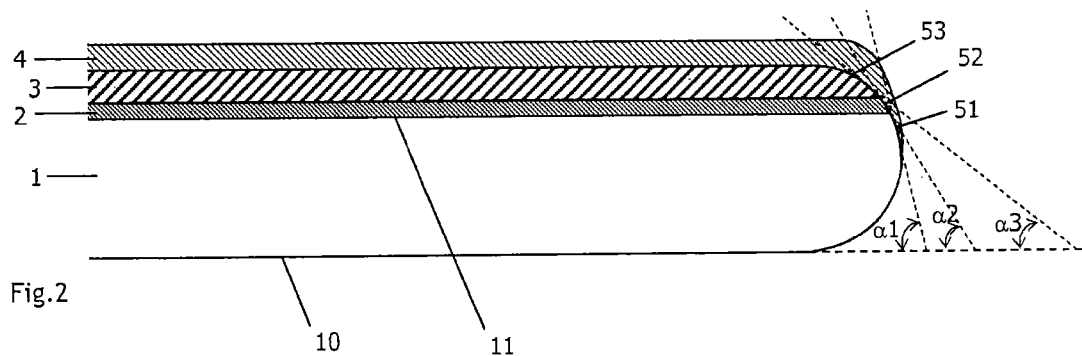
Figure 3:
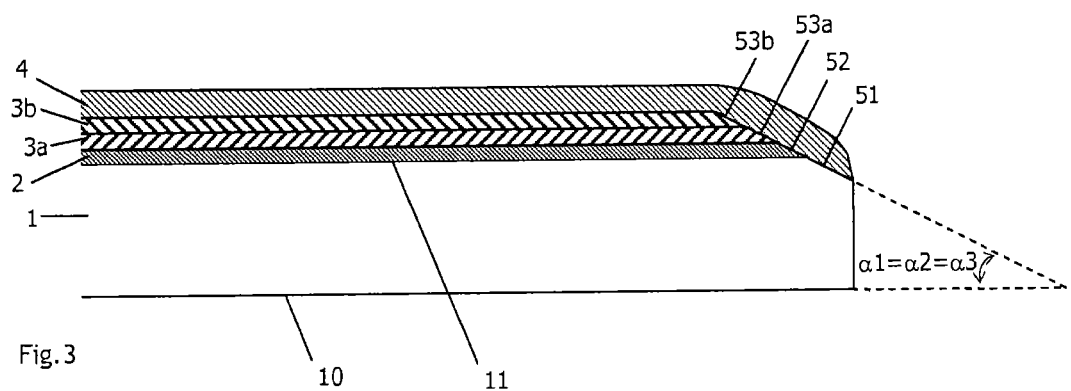

Embodiments of the invention will now be further described, by way of example only, with reference to FIGS. 1 to 3 and to examples 1 to 5, along with comparative examples 1 to 6 which are not in accordance with the present invention.

FIG. 1 is a schematic side view of various edge-working profiles.

FIGS. 2 to 3 are schematic cross-sections of a portion of mirrors according to the invention. Figures are not drawn to scale. Identical texturing is used for corresponding elements in the various figures.

FIG. 1 shows various edge-working profiles which may be used in the process of the present invention:
(a) bevelled profile
(b) chamfered profile (1 side)
(c) chamfered profile (2 sides)
(d) rounded or circular profile FIGS. 2 and 3 show mirrors comprising a glass substrate (1), a silver coating layer (2) and one or two base paint layer(s) (3, 3a, 3b). The glass (1), the silver coating layer (2) and the at least one base paint layer (3, 3a, 3b) are edge-worked and have an edge portion having rear facing surfaces (53a, 53b, 52, 51) arranged at an acute angle (α) to the front surface of the mirror; an additional paint layer (4) covers substantially the whole surface of the at least one base paint layer (3, 3a, 3b) at the rear surface of the mirror and the rear facing surfaces (53a, 53b, 52, 51). In FIG. 2, edge-working has provided a circular profile; in FIG. 3, edge-working has provided a chamfered profile on one side.

Examples 1 to 5 are mirrors according to the present invention. They comprise a mirror of the type MNGE®, a mirror with no copper layer commercialised by AGC Flat Glass Europe SA, comprising a glass substrate, tin and palladium provided at the surface of the glass, a silver coating layer, tin provided at the surface of the silver coating layer and two layers of alkyd-melamine paints.

In example 1, the MNGE® mirror has been edge-worked to provide a circular profile and an additional alkyd-melamine paint layer has been applied by curtain coating.

In example 2, the MNGE® mirror has been edge-worked to provide a circular profile and an additional alkyd-melamine paint layer, of a different composition than in example 1, has been applied by curtain coating.

In examples 3 and 5, the MNGE® mirror has been edge-worked to provide a circular profile and an additional epoxy paint layer has been applied by curtain coating.

In example 4, the MNGE® mirror has been edge-worked to provide a chamfered profile on both sides and an additional alkyd-melamine paint layer, of the same composition than in example 1, has been applied by curtain coating.

Comparative example 1 is a MNGE® mirror. Comparative examples 2 to 4 are identical to examples 2 to 4, except that no edge-working was carried out prior to applying the additional layer of paint. Comparative examples 5 and 6 are identical to examples 1 and 3, respectively, except that the glass substrate was edge-worked, with a circular profile, before silvering and painting.

Examples 1 to 5 and comparative examples 1 to 6 were subjected to a CASS test as hereinabove described during various periods. Results of these tests are presented in Tables I and II. Results of average corrosions are given in μm.

It can be seen from examples 1-4 in Table I that the edge-working step and the application of an additional paint layer covering the base paint layers and the rear facing surface arranged at an acute angle to the front surface of the mirror gave very good results in terms of corrosion resistance, compared to a standard mirror with no copper layer (comparative example 1) or similar mirrors with no edge-working step (comparative examples 2-4).

Bad results in terms of corrosion resistance of comparative examples 5 and 6 may be explained by the edge-working step carried out before silvering. Such edge-working of the glass substrate is required if a tempered mirror is desired; in this case edge-working of the glass substrate is carried out before tempering, then the silver layer and paint layers are applied to the tempered substrate. It is believed that when forming the silver layer on an edge-worked glass substrate, silver may flow more easily on the edges of the glass and cover the edge-worked surface of the glass; this may give a mirror with a silver layer which is more exposed (greater surface of exposure), and thus more subject to corrosion. In comparative examples 5 and 6, the second edge-working step, carried out before the application of the additional paint layer, was not sufficient to avoid the disadvantages of the edge-working of the glass substrate before mirror manufacture. Nevertheless, if the second edge-working step, carried out before the application of the additional paint layer, is sufficient to erase the profile created by the first edge-working step, i.e. the edge-working of the glass substrate, the advantages of the present invention may be recovered and such mirrors may show advantageous CASS test results according to the invention.

Table II demonstrates that the mirrors according to the present invention showed similar corrosion values on each of their four sides.

TABLE I

|  | glass substrate (1) | silver coating layer (2) | base paint layer(s) (3a, 3b) | edge working | additional paint layer (4) | CASS 5 days average | CASS 25 days average | CASS 45 days average |
| --- | --- | --- | --- | --- | --- | --- | --- | --- |
| Ex. 1 | glass | silver | 2 layers of alkyd-melamine paints | circular profile | alkyd-melamine paint G | 50 | 100 | 160 |
| Ex. 2 | glass | silver | 2 layers of alkyd-melamine paints | circular profile | alkyd-melamine paint W | 30 | 190 | 230 |

TABLE I-continued

|  | glass substrate (1) | silver coating layer (2) | base paint layer(s) (3a, 3b) | edge working | additional paint layer (4) | CASS 5 days average | CASS 25 days average | CASS 45 days average |
|---|---|---|---|---|---|---|---|---|
| Ex. 3 | glass | silver | 2 layers of alkyd-melamine paints | circular profile | epoxy paint | no measurable corrosion | 90 | 150 |
| Ex. 4 | glass | silver | 2 layers of alkyd-melamine paints | chamfered (both sides) | alkyd-melamine paint G | no measurable corrosion | no measurable corrosion | 270 |
| Comp. ex. 1 | glass | silver | 2 layers of alkyd-melamine paints | none | none | 140 | 340 | 540 |
| Comp. ex. 2 | glass | silver | 2 layers of alkyd-melamine paints | none | alkyd-melamine paint G | 160 | 450 | 700 |
| Comp. ex. 3 | glass | silver | 2 layers of alkyd-melamine paints | none | alkyd-melamine paint W | 120 | 260 | 400 |
| Comp. ex. 4 | glass | silver | 2 layers of alkyd-melamine paints | none | epoxy paint | 90 | 230 | 340 |
| Comp. ex. 5 | edge-worked glass (circular profile) | silver | 2 layers of alkyd-melamine paints | circular profile | alkyd-melamine paint G | 280 | destroyed | destroyed |
| Comp. ex. 6 | edge-worked glass (circular profile) | silver | 2 layers of alkyd-melamine paints | circular profile | epoxy paint | 630 | 710 | destroyed |

TABLE II

|  | glass substrate (1) | silver coating layer (2) | base paint layer(s) (3a, 3b) | edge working | additional paint layer (4) |  | CASS 5 days average | CASS 25 days average | CASS 45 days average |
|---|---|---|---|---|---|---|---|---|---|
| Ex. 5 | glass | silver | 2 layers of alkyd-melamine paints | circular profile | epoxy paint | edge 1 | no measurable corrosion | 90 | 150 |
|  |  |  |  |  |  | edge 2 | no measurable corrosion | 100 | 200 |
|  |  |  |  |  |  | edge 3 | no measurable corrosion | no measurable corrosion | 160 |
|  |  |  |  |  |  | edge 4 | no measurable corrosion | no measurable corrosion | 150 |

The invention claimed is:

1. A method for manufacturing a mirror, the method comprising in the following sequence:
   a) forming a silver coating layer on a glass substrate;
   b) applying at least one base paint layer over the silver coating layer;
   c) edge-working simultaneously the glass substrate, the silver coating layer, and the at least one base paint layer;
   d) applying by curtain coating an additional paint layer covering substantially a whole surface of the at least one base paint layer and at least a portion of the glass substrate which has been edge-worked,
   wherein the edge-working is made on at least three sides of the mirror; and
   wherein the mirror has an average edge corrosion of less than 300 μm after having been subjected to a 45 days CASS test.

2. The method according to claim 1, wherein the edge-working is made by grinding, beveling, or chamfering.

3. The method according to claim 1, wherein the edge-working is made along substantially the entire periphery of the mirror.

4. The method according to claim 1, wherein the mirror is free of a copper layer.

5. The method according to claim 1, further comprising contacting the glass substrate with an activating solution before forming the silver coating layer.

6. The method according to claim 1, further comprising contacting the silver coating layer with a passivating solution before applying the at least one base paint layer.

7. The method according to claim 1, wherein the edge-working comprises chamfering.

8. The method according to claim 1, wherein the edge-working comprises beveling.

9. The method according to claim 1, wherein the edge-working comprises providing a circular profile to the edge of the mirror.

10. The method according to claim 1, wherein the mirror has an average edge corrosion of less than 80 μm after having been subjected to a 5 days CASS test.

11. The method according to claim 1, wherein the mirror has an average edge corrosion of less than 280 μm after having been subjected to the 45 days CASS test.

12. The method according to claim 1, further comprising
   contacting the glass substrate with an activating solution comprising tin and palladium before forming the silver coating layer; and
   contacting the silver coating layer with a passivating solution comprising tin before applying the at least one base paint layer.

13. The method according to claim 1, wherein the glass substrate has four sides and corrosion resistance is similar at each of the substrate's sides.

* * * * *